United States Patent [19]

Kikuchi et al.

[11] Patent Number: 4,832,364
[45] Date of Patent: * May 23, 1989

[54] REAR SUSPENSION FOR VEHICLE

[75] Inventors: Kenichi Kikuchi, Toyota; Yoshikane Kawai; Makoto Satou, both of Susono; Hakumi Ishii, Okazaki, all of Japan

[73] Assignee: Toyota Jidosha Kabushiki Kaisha, Toyota, Japan

[*] Notice: The portion of the term of this patent subsequent to Jan. 19, 2005 has been disclaimed.

[21] Appl. No.: 88,246

[22] Filed: Aug. 24, 1987

Related U.S. Application Data

[63] Continuation of Ser. No. 823,277, Jan. 28, 1986, Pat. No. 4,720,121.

[51] Int. Cl.$^4$ .............................................. B60G 3/02
[52] U.S. Cl. ...................................... 280/690; 280/701
[58] Field of Search .............. 280/701, 721, 695, 696, 280/700, 717, 725, 664, 673, 690; 267/57.1 R

[56] References Cited

U.S. PATENT DOCUMENTS

| | | | |
|---|---|---|---|
| 2,794,632 | 10/1954 | Schilberg | 280/721 |
| 4,039,205 | 8/1977 | Castanier | 280/721 |
| 4,424,984 | 1/1984 | Shiratori et al. | 280/701 |
| 4,714,270 | 12/1987 | Rumpel | 280/701 |
| 4,715,615 | 12/1987 | Kijima et al. | 280/701 |
| 4,720,121 | 1/1988 | Kikuchi et al. | 280/701 |

FOREIGN PATENT DOCUMENTS

| | | | |
|---|---|---|---|
| 0070025 | 1/1983 | European Pat. Off. | |
| 3148726 | 7/1983 | Fed. Rep. of Germany | |
| 2395853 | 1/1979 | France | |
| 56-1556 | 8/1980 | Japan | |
| 57-090211 | 6/1982 | Japan | |
| 57-134328 | 8/1982 | Japan | 180/312 |
| 58-139807 | 8/1983 | Japan | 280/701 |

Primary Examiner—Charles A. Marmor
Assistant Examiner—Karin Tyson
Attorney, Agent, or Firm—Oblon, Fisher, Spivak, McClelland & Maier

[57] ABSTRACT

A rear suspension for a vehicle including a trailing arm and a link. The trailing arm has inner and outer connections spaced from each other widthwise of a car body and is connected to the car body by a bolt extending through each of bushings disposed in the respective connections. The link has two ends, one end thereof being connected to the car body through a first ball joint having the rotary center thereof disposed on a swinging axis of the trailing arm. The other end of the link is connected to the trailing arm through a second ball joint.

6 Claims, 1 Drawing Sheet

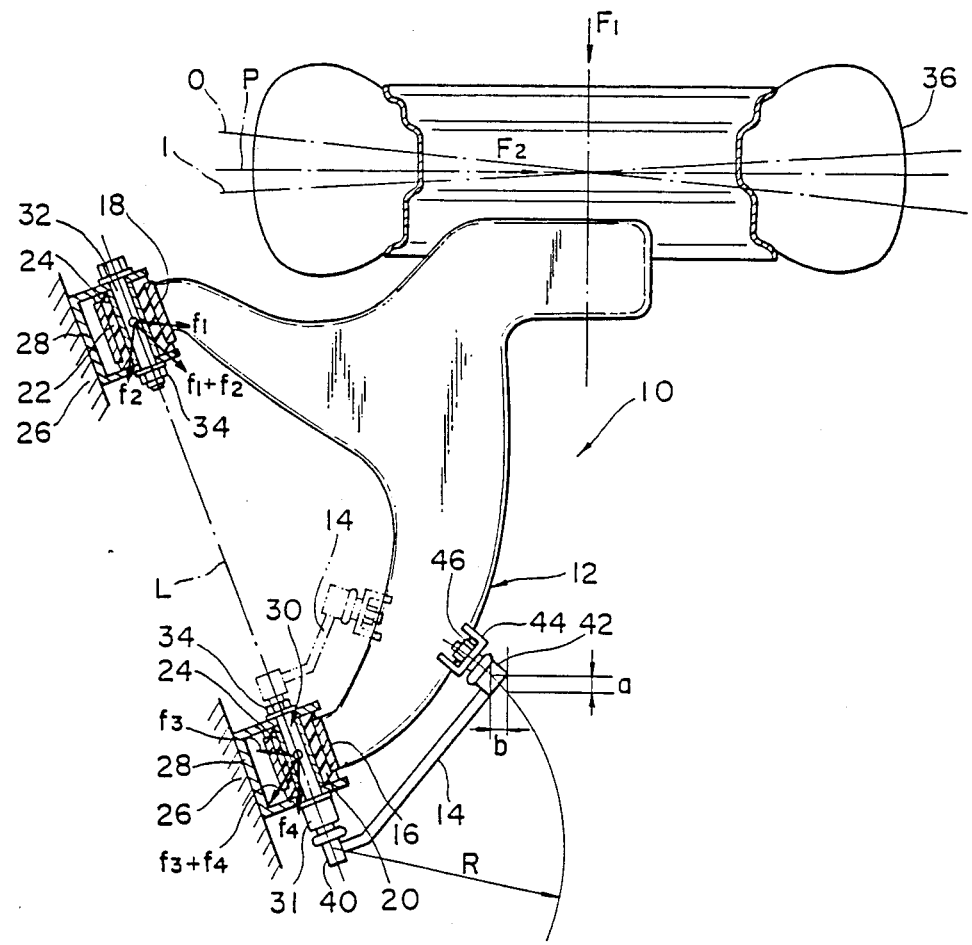

REAR SUSPENSION FOR VEHICLE

This is a continuation of application Ser. No. 823,277, filed Jan. 28, 1986, now U.S. Pat. No. 4,720,121.

BACKGROUND OF THE INVENTION

1. Field of the Invention:

This invention relates to a rear suspension for a vehicle and, more particularly, to a rear suspension provided with a trailing arm having inner and outer connections spaced from each other widthwise of a car body and connected to the car body by a shaft extending through each of bushings disposed in the respective connections.

2. Description of the Prior Art:

In a semitrailing arm type or a full trailing arm type rear suspension, a rubber bushing interposed between each connection of a trailing arm and a car body deflects by a lateral force acting from the road in cornering or lane change or a longitudinal force acting from the road in braking, so that a tire supported by the trailing arm becomes toe out and a vehicle tends to be over steered.

SUMMARY OF THE INVENTION

A rear suspension construction disclosed in the Japanese Utility Model Public Disclosure (KOKAI) No. 90211/82 connects a suspension arm with a car body through an assist link to reduce the tendency of toe-out of the tire. However, since rubber bushings are interposed in both ends of the assist link, these bushings themselves are deflected by the lateral and longitudinal forces. Also, since the assist link extends over the total length of the suspension arm, it needs a large space for receiving it.

A rear suspension disclosed in the Japanese Utility Model Public Disclosure (KOKAI) No. 1556/81 has a knukle arm provided integrally with a spindle and a control rod disposed between the car body and the knuckle arm and is formed to reduce the tendency of toe-out of the tire. Since the knuckle arm is separately provided in the rear suspension, the number of parts is increased. Also, a large space is required for the knuckle arm and the control rod and the degree of freedom is small in arranging the knuckle arm and the control rod not to interfere with other parts.

An object of the present invention is to provide a rear suspension for a vehicle which can reduce the tendency of toe-out of a tire.

Another object of the present invention is to provide a rear suspension for a vehicle which can minimize a necessary space for parts.

A rear suspension for a vehicle according to the present invention comprises a trailing arm for supporting a wheel having inner and outer connections spaced from each other widthwise of a car body and connected to the car body through a shaft extending through each of bushings disposed in the respective connections and a link having one end connected to said car body through a first joint having the rotary center thereof disposed on a swinging axis of the trailing arm and the other end connected to said trailing arm through a second joint, said first and second joints having the rigidities larger than that of said bushing disposed in the inner connection.

According to the present invention the following effects are obtained.

The deflection of the bushing disposed in the inner connection of the trailing arm is restrained by the link to reduce the toe-out of a tire supported by the trailing arm. Thus, the vehicle is prevented from oversteering.

Since the link is connected on both ends to the car body and the trailing arm, respectively, through the joints having rigidities larger than that of the bushing disposed in the inner connection, the deflection of the bushing can be very effectively restrained.

The link extending to an intermediate portion of the trailing arm will be sufficient without needing any large space for positioning of the link.

Since no knuckle arm for restraining the deflection of the bushing disposed in the inner connection is needed, the number of parts is not particularly increased.

Since the rotary center of the joint which connects the link to the car body is placed on the swinging axis of the trailing arm, the link does not interfere with the trailing arm when the trailing arm swings.

The above-mentioned and other objects and features of the invention will become apparent from the following detailed description taken in conjunction with a drawing which indicate an embodiment of the invention.

BRIEF DESCRIPTION OF THE DRAWING

The drawing is a plan view showing principal portions of a rear suspension according to the present invention.

DESCRIPTION OF THE PREFERRED EMBODIMENT

A rear suspension 10 shown in the drawing is of a semitrailing arm type comprising a semitrailing arm 12 and a link 14.

The semitrailing arm 12 has inner and outer connections 16,18 spaced from each other widthwise of a car body. Both connections 16,18 are formed cylindrically to have a common swinging axis L which is inclined to a center axis extending longitudinally of the car body such that the inner connection 16 is behind the outer connection 18. Rubber bushings 20,22 are disposed respectively in the inner and outer connections 16,18. In the embodiment shown in the drawing, a collar 24 is bonded to an inner peripheral surface of each bushing and bears against a bracket 28 secured to a car body 26. The inner and outer connections 16,18 are connected to the car body 26 respectively through a shaft 30 extending through the collar 24 in the bushing 20 and the bracket 28 and a shaft 32 extending through the collar 24 in the bushing 22 and the bracket 28, so that the semitrailing arm 12 is suported swingably about the swinging axis L. In the embodiment shown in the drawing, the shafts 30,32 are bolts on which nuts 34 are screwed respectively. A head 31 of the bolt constituting the shaft 30 is formed larger than that of ordinary bolt.

The semitrailing arm 12 supports rotatably a tire 36. The supporting structure for the tire 36 is well known per se and thus not shown in the drawing since it is not directly related to the present invention.

The link 14 is connected to the car body 26 through a first joint, i.e., ball joint 40, and to the semitrailing arm 12 through a second joint, i.e., ball joint 42. The link 14 preferably has a length extending from an end 16 to an intermediate portion of the semitrailing arm 12. The first ball joint 40 is placed such that the center thereof is disposed on an axis or the extension of an axis of the shaft 30 in the inner connection 16, i.e., on the swinging axis L.

In the embodiment shown, the first ball joint 40 is screwed onto the head 31 of the shaft 30 such that the center thereof coincides with the swinging axis L and secured to the car body 26 through the shaft 30. By this constitution, a space necessary for disposing the ball joint 40 and the link 14 is not substantially different from that for disposing the semitrailing arm 12. Thus, the restriction of the space caused by disposing the link 14 is little. The same effect is obtained by the arrangement as shown by the imaginary line, that is, the link 14 is extended from an outer end of the shaft 30 or an end of the nut 34 to the trailing arm 12.

However, the ball joint 40 can be secured to the car body 26 on any position of the swinging axis L, ex., a position of the swinging axis L spaced inwardly from the shaft 30 or a position located between the shaft 30 and the shaft 32.

The second ball joint 42 is secured to the semitrailing arm 12 through a bracket 44 by screwing a nut 46 onto a portion of said second ball joint 42.

The operation of the embodiment is as follows.

The tire 36 is held to the initial position P by the semitrailing arm 12.

When a vehicle travels and an inward lateral force $F_1$, backward longitudinal force $F_2$ or both forces act on the tire 36 in the travelling, the rear suspension 10 reduces the toe-out of the tire 36 and brings about the toe-in or toe-in tendency of the tire 36. In any case, it is same qualitatively so that the case in which the lateral force $F_1$ acts will be described qualitatively hereinafter.

By the lateral force $F_1$ are applied backward and inward components $f_1$ and $f_2$ of force to the bushing 22 in the outer connection 18 and consequently, a slant backward force of $f_1+f_2$ acts on the bushing 22 to deflect the bushing 22 backwardly. On the other hand, the forward component $f_3$ of force and the inward component $f_4$ are applied to the bushing 20 in the inner connection 16 by the lateral force $F_1$, so that the slant forward force of $f_3+f_4$ acts on the bushing 20 to deflect the bushing 20 forwardly. Thus, unless the link 14 is provided, the semitrailing arm 12 will be displaced clockwise as a whole, so that the tire 36 becomes toe-out 0 and the vehicle is oversteered.

However, since the link 14 is interposed between the car body 26 and the semitrailing arm 12, the actual operation will be as follows; that is, even if the force of $f_3+f_4$ acts on the bushing 20 in the inner connection 16, the bushing 20 is prevented from forward deflection by the presence of the link 14, and on the contrary the bushings 20 and 22 are deflected inwardly by the presence of the inward component $f_4$ of force on the bushing 20 in the inner connection and the inward component $f_2$ of force on the bushing 22 in the outer connection to move the link 14 on an arc of radius R. Assuming that the inward deflections of the bushings 20,22 is a, the link 14 will be moved backwardly by b and the inner bushing 20 will be deflected backwardly by the amount b. Thus, since both busings 20,22 are deflected backwardly, the toe-out amount of the conventional tire 36 can be reduced, so that the tire 36 can have a positive toe-in 1 according to the arrangement of the link 14 and the spring characteristics of the bushings 20,22.

Further, in said embodiment, the rear suspension 10 is of a semitrailing arm type. Instead, the present invention can be utilized in a so-called full-trailing arm type rear suspension in which the swinging axis L is orthogonal to the center line of the car body. In this specification, the trailing arm means both types.

In said embodiment, the first and second joints provided on both ends of the link 14 are ball joints. Instead, the respective joints may be constituted from rubber bushings having the rigidity larger than that of the busing 20. In this case, the first joint is disposed to place the rotary center on the swinging axis L.

What is claimed is:

1. A rear suspension for a vehicle, comprising:
   a trailing arm for supporting a wheel having inner and outer connections spaced from each other widthwise of a car body and connected to the car body by a shaft extending through a bushing disposed in each respective connection; and
   a link having a first end connected to said car body through a first joint having the rotary center thereof disposed on a swinging axis of the trailing arm and a second end connected to said trailing arm through a second joint, the first joint being connected to the shaft which is engaged with the inner connection, and the first and second joints having rigidities larger than that of said bushing disposed in the inner connection.

2. A rear suspension for a vehicle comprising:
   a trailing arm for supporting a wheel having inner and outer connections spaced from each other widthwise of a car body and connected to the car body by a shaft extending through a bushing disposed in each respective connection; and
   a link having one end connected to said car body through a first joint having the rotary center thereof disposed on a swinging axis of the trailing arm and a second end connected to said trailing arm through a second joint, said first and second joints having rigidities larger than that of said bushing disposed in the inner connection,
   wherein said shaft in the inner connection comprises a bolt, on a head of which is mounted said first joint.

3. A rear suspension for a vehicle comprising:
   a trailing arm for supporting a wheel having inner and outer connections spaced from each other widthwise of a car body and connected to the car body by a shaft extending through a bushing disposed in each respective connection; and
   a link having a first end connected to said car body through a first joint having the rotary center thereof disposed on a swinging axis of the trailing arm and a second end connected to said trailing arm through a second joint, said first and second joints having rigidities larger than that of said bushing disposed in the inner connection,
   wherein said shaft in the inner connection comprises a bolt, and said first joint is mounted on a nut screwed onto the bolt.

4. A rear suspension for a vehicle, comprising:
   a trailing arm for supporting a wheel having inner and outer connections spaced from each other widthwise of a car body and connected to the car body by a shaft extending through each bushing disposed in each of the respective connections; and
   a link having a first end connected to said car body through a first joint having the rotary center thereof disposed on a swinging axis of the trailing arm and a second end connected to said trailing arm through a second joint, the first joint being located at a position inward of the inner connection, and the first and second joints having rigidities larger than that of said bushing disposed in the inner connection.

5. A rear suspension as claimed in claim 4, wherein said first joint comprises a ball joint.

6. A rear suspension as claimed in claim 5, wherein said trailing arm comprises a semi-trailing arm.

* * * * *

UNITED STATES PATENT AND TRADEMARK OFFICE
CERTIFICATE OF CORRECTION

PATENT NO. : 4,832,364
DATED : MAY 23, 1989
INVENTOR(S) : KENICHI KIKUCHI ET AL

It is certified that error appears in the above-identified patent and that said Letters Patent is hereby corrected as shown below:

On the title page, item [30], the Foreign Application Priority Data has been omitted. It should read as follows:

--Jan. 28, 1985 (JP) Japan .................. 12637/85--

Signed and Sealed this

Thirtieth Day of January, 1990

Attest:

JEFFREY M. SAMUELS

*Attesting Officer*   Acting Commissioner of Patents and Trademarks